Dec. 21, 1954  T. W. HORN  2,697,323
PIVOTED MOWER BLADE
Filed Nov. 26, 1952
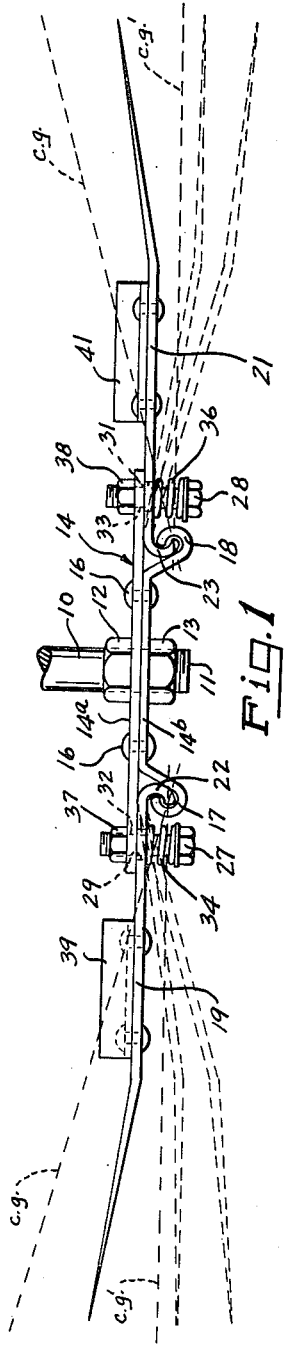
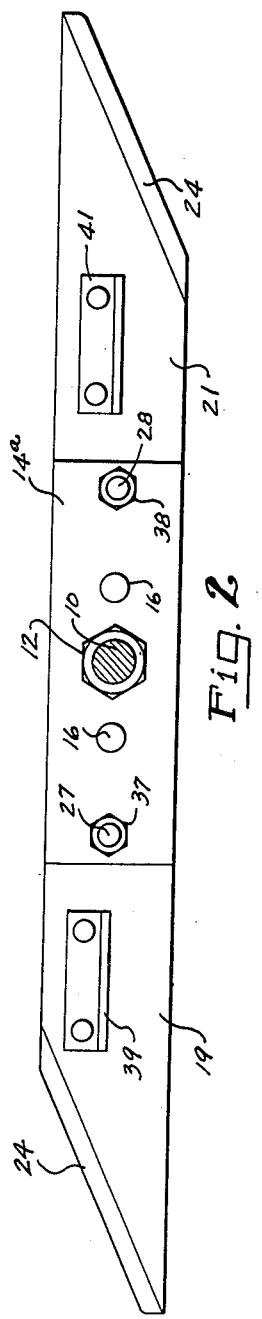
INVENTOR.
THURMAN W. HORN
BY Jennings V. Carter
ATTORNEYS United States Patent Office 2,697,323
Patented Dec. 21, 1954

2,697,323

PIVOTED MOWER BLADE

Thurman W. Horn, Anniston, Ala.

Application November 26, 1952, Serial No. 322,680

6 Claims. (Cl. 56—295)

This invention relates to a lawn mower of the type having a blade mounted for rotation about a vertical shaft and has for an object the provision of a blade assembly in which the elevation of the cutting plane of the blade above the ground may be varied while the mower is in operation.

A more particular object of my invention is to provide a mower blade assembly mounted for rotation about a vertical shaft in which the cutting plane of the blade varies in elevation responsive to the angular velocity of the blade.

Briefly my invention comprises a blade holder mounted on a vertical shaft with a pair of blade sections hingedly connected to the underside of the holder and having their centers of gravity lying in a line extending upwardly therefrom. Spring means are employed to hold the blade sections in their uppermost positions whereby they assume lower positions responsive to the angular velocity of the shaft. The height at which grass is cut may thus be varied by simply varying the speed of rotation of the shaft. It is contemplated, of course, that my improved assembly will be employed preferably with a variable speed driving motor.

A mower blade assembly constructed in accordance with my invention is illustrated in the accompanying drawing forming a part of this application, in which:

Fig. 1 is a front elevational view of the assembly; and
Fig. 2 is a plan view thereof.

Referring to the drawing I show the vertical shaft 10 of the lawn mower. The lower end of the shaft is threaded as at 11, and mounted on the shaft by means of nuts 12 and 13 is a blade holder 14. The blade holder is in two parts comprising an upper plate 14a and a lower plate 14b, secured together by means of rivets 16. The lower plate 14b terminates in hooks 17 and 18 which are curved upwardly as shown to form one-half of a hinge connection.

Hingedly connected to the hooks 17 and 18 are blade sections 19 and 21 having hook shaped inner ends 22 and 23 which engage the hooks 17 and 18 as shown to form the other half of the hinge, or pivotal connection with the blade holder. The outer ends of the sections 19 and 21 are each provided with a cutting edge 24 as is well understood in the art. Bolts 27 and 28 pass upwardly through holes 29 and 31 in the blade sections with a loose fit, and through holes 32 and 33 in the upper plate 14a of the blade holder. Springs 34 and 36 surround the bolts 27 and 28 and press the blade sections upwardly into engagement with the upper plate 14a. Nuts 37 and 38 on the upper ends of the bolts serve to vary the compression of the springs.

Mounted on the upper sides of the blade section are weight members 39 and 41 which serve to locate the centers of gravity of the blade sections 19 and 21. When the blade sections are at rest, the center of gravity of each is located along a line extending upwardly from its hinge connection at an acute angle to the axis of rotation of the shaft 10, as indicated at c. g. in Fig. 1. Accordingly, when the blade sections are at rest their centers of gravity lie in a horizontal plane above that of their pivotal connections. It will be apparent that upon rotation of the shaft 10, the blade sections, responsive to centrifugal force, will seek to assume a position in which the lines from the pivotal connections through their centers of gravity are normal to the axis of rotation of the shaft 10, as shown at c. g.' in Fig. 1. That is, the blade sections seek to assume positions in which their pivotal connections and centers of gravity lie in the same horizontal plane. In operation, the blade sections overcome the compression of the springs 34 and 36 and move downwardly assuming the positions indicated by the dotted lines in Fig. 1, and intermediate positions, depending upon the angular velocity of the shaft 10. The extent to which the cutting portions of the blade sections move downwardly depends also upon the compression of the springs 34 and 36 which may be varied by means of the nuts 37 and 38. By the expression axis of rotation, I mean a straight line passing through the shaft 10 around which the blade sections revolve.

My improved blade assembly is especially useful in mowing lawns in which the thickness of the sod varies. Where the grass is thick on one section of the lawn, it may be desirable to mow it relatively close, whereas, if the grass is thin it is more desirable not to cut it too close. Under such circumstances, the velocity at which the blade is rotated is varied to accommodate it to the service demanded.

While I have shown my invention in but one form it will be obvious to those skilled in the art that it is not so limited, but is susceptible to various changes and modifications without departing from the spirit thereof, and I desire, therefore, that only such limitations shall be placed thereupon as are specifically set forth in the appended claims.

What I claim is:

1. In a cutter assembly for mowers, a rotary blade supporting member mounted for rotation in a horizontal plane about a vertical axis, a pair of blade sections pivotally connected at their inner ends on the supporting member for the outer ends thereof to extend outwardly and move upwardly, and resilient means biasing the blade sections toward positions wherein their centers of gravity are above their pivotal connections.

2. A mower blade assembly mounted for rotation about a vertical axis comprising a substantially uniplanar support, at least one blade pivotally mounted adjacent its inner end on said support about a horizontal pivot, and yieldable means coacting between said support and said blade biasing said blade into an outwardly extended position.

3. In a mower blade assembly mounted for rotation about a vertical shaft, a blade holder mounted on the shaft, a pair of blade sections pivotally connected about horizontal pivots at their inner ends to the blade holder and extending upwardly and outwardly therefrom, and spring means biasing the blade sections upwardly toward positions wherein the centers of gravity thereof lie in a horizontal plane above that of their pivotal connections.

4. In a mower blade assembly including a vertical shaft and a cutting blade mounted to rotate with the shaft, a horizontally disposed blade holder mounted on the shaft, a pair of blade sections pivotally connected about horizontal pivots at their inner ends to the blade holder and extending outwardly therefrom, spring means coacting between the blade sections and their support biasing the blade sections upwardly toward positions wherein their centers of gravity lie in a horizontal plane above that of their pivotal connections, and means to limit both upward and downward movements of the blade sections about their pivotal connections.

5. In a mower blade assembly including a vertical shaft and a cutting blade mounted to rotate with the shaft, a horizontally disposed blade holder mounted on the shaft, a pair of blade sections hingedly connected with horizontal pivots to the underside of the blade holder inwardly thereof with respect to the shaft and extending outwardly and upwardly therefrom with their upper sides normally bearing against the blade holder to limit upward movement thereof, the centers of gravity of said blade sections being normally above their hinge connections with the blade holder, and spring means coacting between the blade sections and their support outwardly of their hinge connections to hold the blade sections yieldably in their upper positions.

6. Apparatus as defined in claim 5 in which means are provided to vary the force exerted by the spring means.

References Cited in the file of this patent

UNITED STATES PATENTS

| Number | Name | Date |
|---|---|---|
| 2,281,639 | Swan | May 5, 1942 |
| 2,529,797 | Cauble | Nov. 14, 1950 |
| 2,529,870 | Golasky | Nov. 14, 1950 |
| 2,654,986 | Gold | Oct. 13, 1953 |